United States Patent Office 3,242,132
Patented Mar. 22, 1966

3,242,132
STABILIZED POLYPROPYLENE
William F. Geigle, Springfield, Pa., assignor to Sun Oil Company, Philadelphia, Pa., a corporation of New Jersey
No Drawing. Filed June 29, 1961, Ser. No. 120,487
4 Claims. (Cl. 260—41)

This invention relates to the stabilization of solid, substantially crystalline, isotactic polypropylene, and more particularly to new compositions of matter comprising such a solid polymer of relatively high molecular weight and a synergistic heat and light stabilizing composition therefor.

Solid, substantially crystalline, isotactic polypropylene has been prepared by polymerizing propylene in the presence of a solid catalytic material. A catalyst system which is especially effective for such a polymerization is the combination of a halide of titanium, such as titanium trichloride, and an aluminum alkyl, such as aluminum triethyl or diethylaluminum chloride. In a typical procedure, the catalyst is prepared by admixing, for example, titanium tetrachloride and aluminum triethyl in an inert solvent such as isooctane to produce a reaction product which acts as a catalyst for polymerizing the alpha-olefin to solid polymers. On the other hand, a lower halide, such as titanium trichloride, can be preformed, dispersed in an inert liquid, and an activator, such as aluminum alkyl, added. In performing the polymerization step, the monomer is contacted with the solid catalyst, such as by passing the propylene into the liquid reaction mixture and is thereby polymerized to solid polymers. Anhydrous and oxygen-free conditions are used throughout the process, since the catalyst is deactivated by contact with water or oxygen. Other specific catalyst systems, i.e., other metal halide or metal oxide catalyst systems, as well as the other process condition, necessary for the preparation of the polypropylene described herein are illustrated by pages 350 through 361, 416 through 419, 452 and 453 of "Linear and Stereoregular Addition Polymers" by Norman G. Gaylord and Herman F. Mark, Interscience Publishers, 1959, the contents of which are incorporated herein by reference.

Polypropylene prepared by the process described above has a melting point of from 160° C. to 175° C., a tensile strength of from 3,000 to 6,000 p.s.i. (pounds per square inch), and a molecular weight of from 50,000 to 850,000 or more (light-scattering). Usually a mixture of crystalline and amorphous polymer is obtained. If desired, the amorphous polymer can be separated from the crystalline polymer which is isotactic in nature by contacting a mixture thereof with a hydrocarbon solvent, such as isooctane or n-heptane, at an elevated temperature. The amorphous polymer is substantially soluble under these conditions, whereas the isotactic crystalline polymer is substantially insoluble. The compositions of the present invention are prepared from either crystalline polymers, or mixtures of crystalline with amorphous polymers, in which the mixture contains at least 25%, and preferably at least 50% by weight of the crystalline polymer as determined by X-ray diffraction.

Such polymers may be molded, extruded, or otherwise fabricated to form many useful articles. However, the above-described polypropylene is susceptible to degradation caused by exposure to light. Particularly severe degradation of non-stabilized polypropylene takes place when it is exposed to light in the ultra-violet portion of the spectrum. In addition, the non-stabilized polypropylene described above is degraded by elevated temperature. Degradation apparently results from free-radical formation, which formation is promoted by heat, or ultra-violet light, and impurities such as metals and metal compounds. The free-radicals which are formed undergo further chemical reactions, resulting in undesirable chemical and physical transformations. Thus polypropylene deteriorates prematurely, loses tensile strength, molecular weight and other desirable properties, such as pliability and impact strength, and becomes discolored and embrittled.

An object of the present invention is to provide compositions comprising substantially crystalline, isotactic, solid polypropylene containing a minor quantity of a synergistic composition effective to stabilize the polymer against degradation. It is a specific object of this invention to provide compositions comprising the above-described polypropylene containing minor quantities of a synergistic stabilizing composition effective to substantially prevent degradation of the polymer caused by exposure to light, particularly the ultra-violet portion of the spectrum. It is another specific object of this invention to provide compositions comprising the above-described polypropylene containing minor quantities of a synergistic stabilizing composition effective to substantially prevent degradation of the polymer caused by heat. It is a further object of this invention to provide a method by which polypropylene is so-stabilized.

According to one embodiment of the present invention, it has been found that remarkably stable polypropylene compositions are obtained by admixing with the substantially crystalline, solid, isotactic polymer a stabilizing quantity of each of carbon black and di-beta-naphthyl-para-phenylene diamine having the formula:

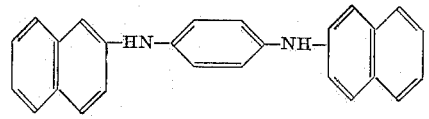

The use of a stabilizing quantity, e.g., from about 0.01% to about 5% by weight of each of carbon black and the diamine of this invention, preferably about 0.2% to about 2.0% of each, in combination with the polypropylene described herein imparts remarkable stability thereto against degradation caused by exposure to heat and to light, particularly that portion of the spectrum which includes ultra-violet light.

Numerous stabilizers have been disclosed in the prior art for arresting degradation of other olefin polymers. However, it has been found that virtually none of them is useful in the polypropylene of this invention; see page 192, volume 37, No. 5 of "Modern Plastics," January 1960. For example, beta-naphthyl phenylamine, having the formula:

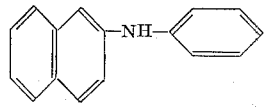

is entirely ineffective as a stabilizer for polypropylene notwithstanding its structural relationship to the amine of this invention. It is clear then that the probable mechanism by which the olefin polymers known heretofore degrade is entirely different from the mechanism by which polypropylene degrades. Accordingly, the mechanism by which polypropylene is stabilized is unrelated to that by which other olefin polymers are stabilized. On the other hand, carbon black has been used in the past in various polymers as a convenient pigment or filler. Indeed, it has been suggested that carbon black be used in various polymers as a light stabilizer, e.g., polyethylene; however, it imparts little or no heat stability to polypropylene. Similarly, Tomlinson discloses and claims the use of di-beta-naphthyl-para-phenylene diamine as a heat and light stabilizer for polypropylene in U.S. application Serial Number 46,095, filed July 29, 1960. However, as will be apparent from the data herein, it has been unexpectedly found that the combination of this invention synergistically stabilizes polypropylene against the degrading action of both light and heat.

Each of the components of the stabilizer composition may be combined with polypropylene by any method suitable for the preparation of homogeneous mixtures. For example, the polymer may be melted and the components of the synergistic composition of this invention admixed therewith by milling on heated rolls or by using a Banbury mixer. Alternatively, the stabilizer components may be combined, in a solid or liquid state, with a solution or suspension of the polymer in a suitable liquid. In another process, one dissolves the amine stabilizer component in a suitable solvent, admixes powdered polymer and carbon black therewith, and evaporates the solvent. In another mode of operation, the solid stabilizer components are thoroughly dry-mixed with the solid polymer. In general, it is preferable that the mixing process be carried out in an inert atmosphere, or under vacuum, in order to prevent oxidation of the polymer.

Several criteria are used to determine the effectiveness of the stabilizers in the compositions of this invention. Since non-stabilized polypropylene is normally drastically degraded when exposed to ultra-violet and visible light, particularly the high ultra-violet and the low visible light, the extent of this degradation is measured. One method of determining the extent of degradation involves the use of the Carbon-Arc Lamp Test in the Atlas Fade-ometer substantially in the manner described in Standard Test Method 16A–1957 of the American Association of Textile Chemists and Colorists. According to this test, yarns (multifilaments) or monofilaments under tension are exposed to the light produced by a carbon arc. Every 20 hours the filaments are examined to determine whether or not there has been any breakage. If so, the test is terminated; if not the test is continued until breakage occurs. Meanwhile, at 60 hour intervals the filaments are tested on an Instron tensile tester and compared with unexposed filaments. In the illustrative examples given below, the filaments (i.e., mono- or multifilaments) are wound on standard black faced "mirror" cards (6½ x 9⅓ inches) and secured thereto at the margins with cellophane tape. Winding thereof is performed using a Universal winding device at a tension of 0.75 g., and when so-wound, each card contains 3 groups of filaments having 5 to 8 monofilaments or multifilaments in each group.

In addition to degradation caused by exposure to light, non-stabilized polypropylene is rapidly degraded by exposure to elevated temperature during fabrication and use. Virtually none of the materials known as ultra-violet stabilizers for other polymers contribute to the heat stability of that polymer. Unexpectedly, the combination of the diamine of this invention and carbon black imparts outstanding light and heat stability to polypropylene. In the examples given below, heat stability is measured on polypropylene in the following manner. Four monofilament fibers from each sample are tied to a glass rod which is then placed in a forced air oven in a horizontal position. Each fiber is held taut in a vertical position by means of a glass weight tied to the lower end of the fiber. This weight applies a tension of about 0.01 to 0.015 gram per denier to the fiber. The oven is held at 125° C. air temperature and the oven life constitutes the number of hours the polypropylene filaments remain exposed to this temperature and atmosphere without breaking.

The following examples are given by way of illustration and not by way of limitation, the scope of the invention being determined by the appended claims.

EXAMPLE 1

Polypropylene monofilaments were spun containing 1% by weight of carbon black, 0.95% by weight of di-beta-naphthyl-para-phenylene diamine, and 0.05% by weight of 2,5-ditertiarybutyl hydroquinone, the latter being an antioxidant. These monofilaments were exposed in an Atlas Fade-ometer and the data found in Table I was compiled therefrom in the manner described above.

Three sets of control monofilaments were spun also and designated A, B, and C. Control filaments A consisted of polypropylene and 1% by weight of carbon black; B consisted of polypropylene, 0.95% di-beta-naphthyl-para-phenylene diamine, and 0.05% by weight of 2,5-ditertiary-butyl hydroquinone; and C consisted of polypropylene. Control monofilaments A, B, and C were exposed in an Atlas Fade-ometer in the same manner as the monofilaments of Example 1 to give the data tabulated in Table I. Duplicates of the monofilaments of each of Example 1 and Controls A, B, and C were exposed to a temperature of 125° C. in an air oven, the hours to break thereof being an average from four monofilaments.

EXAMPLE 2

Example 1 was repeated substituting 1% by weight of di-beta-naphthyl-para-phenylene diamine for the two-part stabilizer composition thereof. Control D was run as a duplicate of Example 2 except that no carbon black was used.

EXAMPLE 3

Example 2 was repeated with 1% by weight of di-beta-naphthyl-para-phenylene diamine, 1.15% by weight of carbon black, 0.42% by weight of Phthalocyanine Blue, 0.06% by weight of Phthalocyanine Green, and 0.25% by weight of titanium dioxide, the latter three pigments being added to the carbon black in order to obtain a jet black color. These monofilaments were exposed in the Fade-ometer and the oven in the same manner as in Examples 1 and 2 to give the data tabulated in Table I.

*Table I*

| | Fade-ometer, Hours to Break | Denier | Tenacity Retained, Fade-ometer Hrs. | 125° C. to Break, Hours |
|---|---|---|---|---|
| Example 1 | No break at 3,960 | 120 | 67.5% at 1,000 | 904 |
| Control A | Broken between 800 and 820 | 132 | 36% at 500 | 63 |
| Control B | Broken between 160 and 180 | 119 | 36% at 120 | 280 |
| Control C | Broken between 0 and 20 | 130 | None at 20 | 12 |
| Example 2 | No break at 3,400 | 125 | 75% at 1,000 | |
| Control D | Broken between 240 and 260 | 130 | | 321 |
| Example 3 | No break at 3,400 | 165 | 86% at 1,000 | 905 |

The foregoing data point up the synergistic stabilizing affect of the combination of the diamine of this invention with carbon black. Thus the combinations of Examples 1, 2, and 3 had not failed in the Fade-ometer at 3960 hours, 3400 hours, and 3400 hours respectively, whereas the sum of A and B was less than 1000 hours to failure and the sum of A and D was about 1050 hours to failure in the Fade-ometer. Similarly, the filaments of Examples 1 and 3 failed in the 125° C. oven only after more than 900 hours, whereas the sum of A and B indicates failure in less than 350 hours at 125° C.

EXAMPLE 4

The procedure of Examples 1 through 3 was repeated using 0.35% by weight of di-beta-naphthyl-para-phenylene diamine, 0.25% by weight of nickel dibutyldithiocarbamate, and 1.0% by weight of carbon black in monofilaments having a denier of 114. After 1000 hours' exposure in the Fade-ometer these filaments retained 77.5% of their tenacity and had not broken after 3420 hours exposure therein.

EXAMPLE 5

The procedure of Example 4 was repeated substituting 0.7% by weight of said diamine, 0.5% by weight of said dithiocarbamate, and 1.0% by weight of carbon black in monofilaments having a denier of 115. After 1000 hours exposure in the Fade-ometer these filaments retained 89% of their tenacity and were unbroken after 3180 hours exposure therein.

The invention claimed is:

1. A light and heat stable composition comprising solid, isotactic, substantially crystalline polypropylene and a stabilizing quantity of a synergistic combination of di-beta-naphthyl-para-phenylene diamine and carbon black, said stabilizing quantity being from about 0.2% to about 2% by weight of each of said diamine and carbon black based on the weight of said composition.

2. A process of inhibiting degradation of polypropylene caused by exposure to heat and light which comprises admixing solid isotactic, substantially crystalline polypropylene and a stabilizing quantity of a synergistic combination of di-beta-naphthyl-para-phenylene diamine and carbon black, said stabilizing quantity being from about 0.2% to about 2% by weight of each of said diamine and carbon black based on the weight of said composition.

3. Yarns comprising the stabilized polypropylene composition of claim 1.

4. Monofilaments comprising the stabilized polypropylene composition of claim 1.

References Cited by the Examiner

UNITED STATES PATENTS

| 2,852,488 | 9/1958 | Clark et al. | 260—45.9 |
| 2,938,879 | 5/1960 | Mock et al. | 260—41 |
| 2,967,845 | 1/1961 | Hawkins et al. | 260—41 |
| 2,985,617 | 5/1961 | Salyer et al. | 260—45.7 |
| 3,020,258 | 2/1962 | Robbins | 260—45.9 |

FOREIGN PATENTS

| 223,956 | 1/1958 | Australia. |
| 472,103 | 3/1951 | Canada. |
| 1,171,286 | 1/1959 | France. |
| 1,201,217 | 7/1959 | France. |

MORRIS LIEBMAN, *Primary Examiner.*

ALEXANDER H. BRODMERKEL, LEON J. BERCOVITZ, *Examiners.*